(No Model.) 4 Sheets—Sheet 1.

W. HUEY.
COMBINED SHAPING AND SAWING MACHINE.

No. 371,504. Patented Oct. 11, 1887.

WITNESSES:
Fred G. Dieterich
Edw. W. Byrn.

INVENTOR:
Wm. Huey
BY Munn & Co.
ATTORNEYS.

(No Model.) 4 Sheets—Sheet 2.

W. HUEY.
COMBINED SHAPING AND SAWING MACHINE.

No. 371,504. Patented Oct. 11, 1887.

WITNESSES:
Fred G. Dieterich
Edw. W. Byrn

INVENTOR:
Wm Huey
BY Munn & Co
ATTORNEYS.

(No Model.) 4 Sheets—Sheet 3.

W. HUEY.
COMBINED SHAPING AND SAWING MACHINE.

No. 371,504. Patented Oct. 11, 1887.

WITNESSES:
Fred G. Dieterich
Edw. U. Byrn

INVENTOR:
Wm Huey
BY Munn &
ATTORNEYS.

N. PETERS. Photo-Lithographer, Washington, D. C.

(No Model.) 4 Sheets—Sheet 4.
W. HUEY.
COMBINED SHAPING AND SAWING MACHINE.
No. 371,504. Patented Oct. 11, 1887.
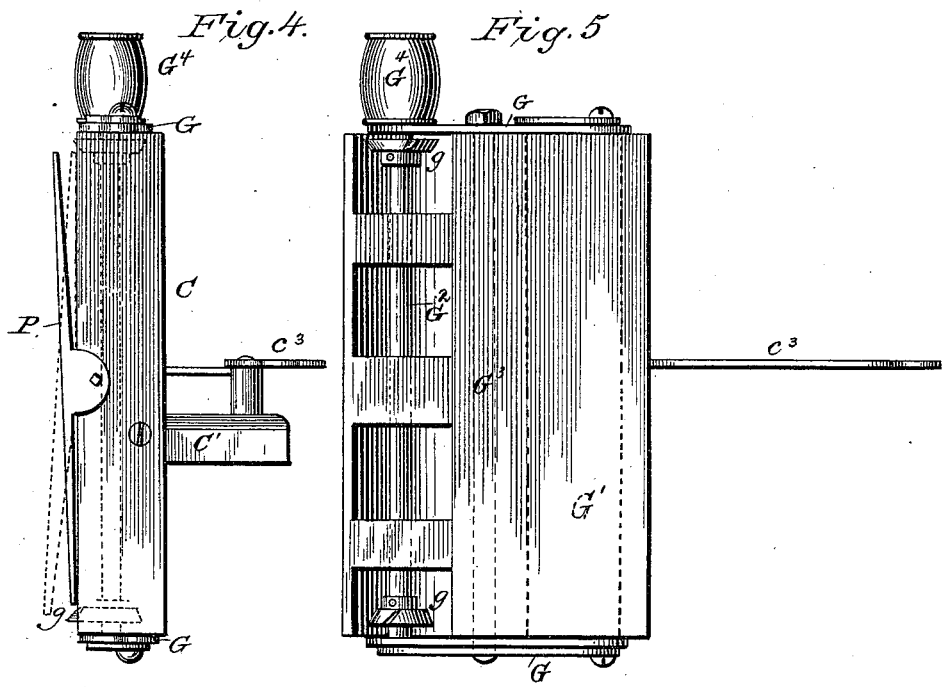
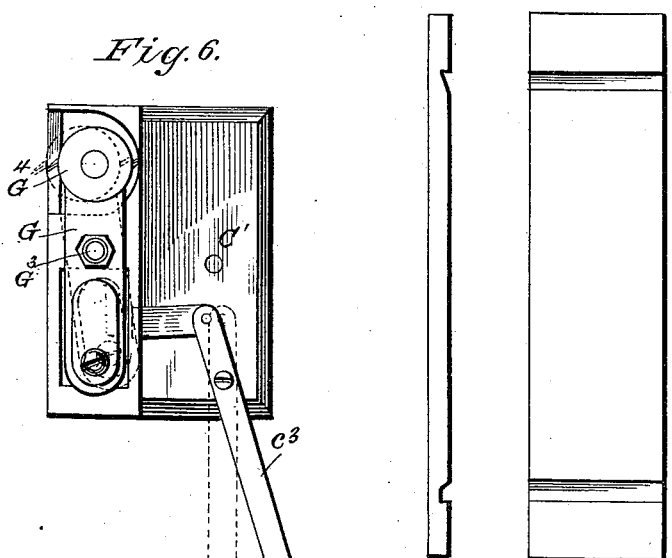
WITNESSES:
Fred G. Dieterich
Edw. W. Byrn
INVENTOR:
Wm. Huey
BY Munn & Co.
ATTORNEYS.

United States Patent Office.

WILLIAM HUEY, OF SEAFORD, DELAWARE, ASSIGNOR TO THE HUEY MANUFACTURING COMPANY.

COMBINED SHAPING AND SAWING MACHINE.

SPECIFICATION forming part of Letters Patent No. 371,504, dated October 11, 1887.

Application filed January 27, 1887. Serial No. 225,707. (No model.)

*To all whom it may concern:*

Be it known that I, WILLIAM HUEY, of Seaford, in the county of Sussex and State of Delaware, have invented a new and useful Improvement in Combined Shaping and Sawing Machines, of which the following is a specification.

The object of my invention is to provide a machine which shall in one operation cut out and saw off a round disk from a block or bolt of wood to form the bottom of a fruit basket or measure, or the head of a keg or barrel, in a simple, practical, and rapid manner, and which machine is also applicable for cutting from a block staves for a keg or barrel and simultaneously cutting the croze or for simultaneously cutting tapered shingles and sawing off the butts.

It consists in the peculiar construction and arrangement of parts forming a compound sawing-machine, which I will now proceed to described with reference to the drawings, in which—

Figure 1:
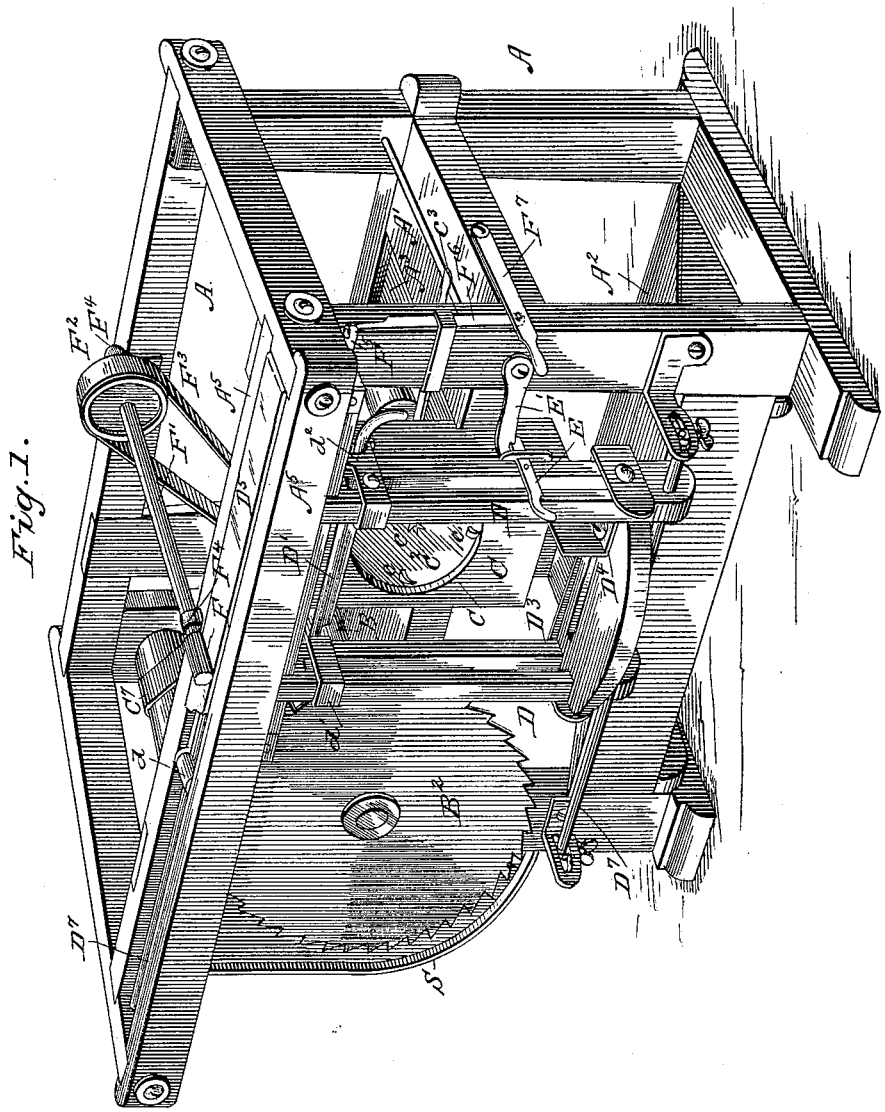
Figure 2:
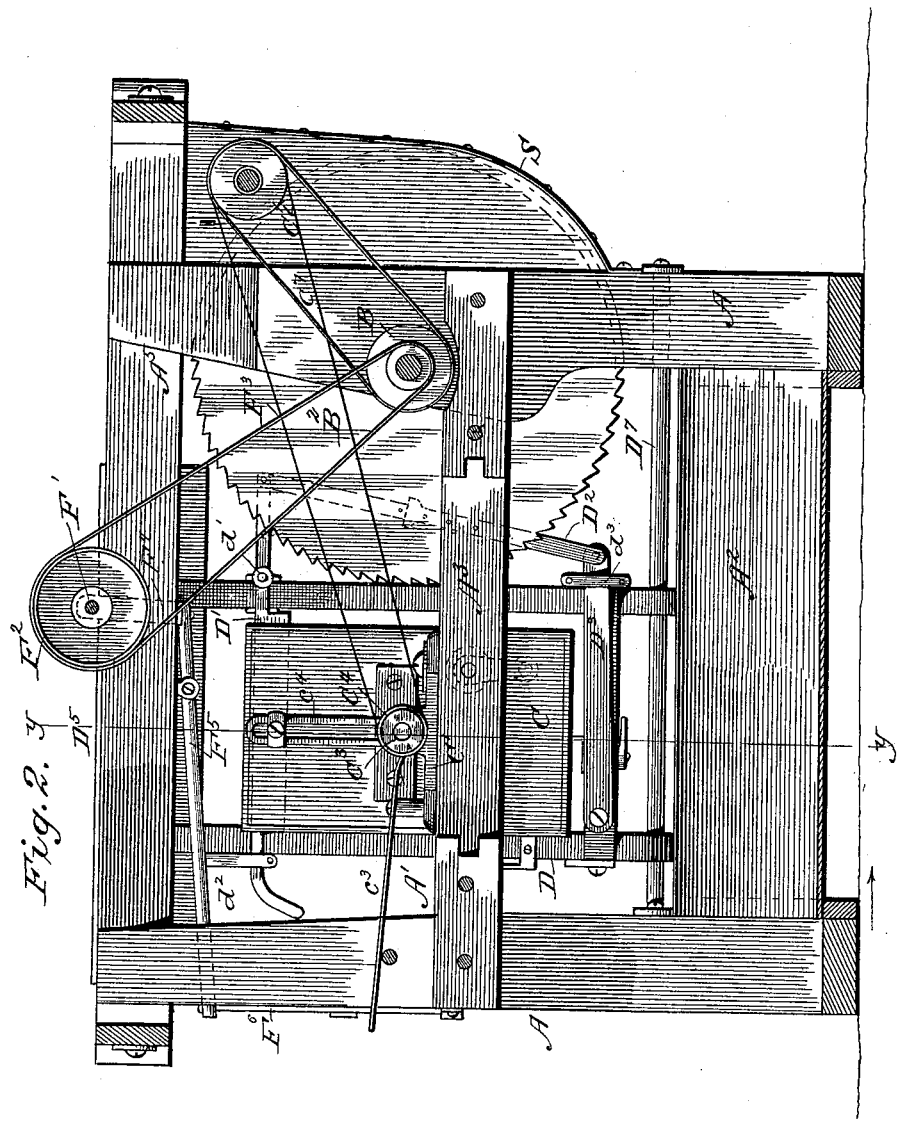
Figure 3:
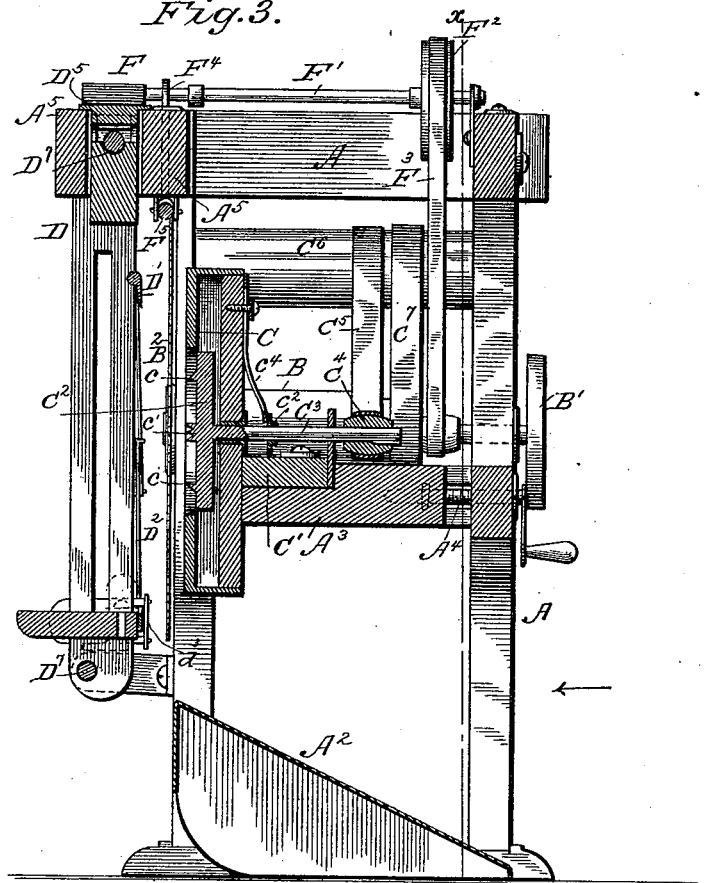

Figure 1 is a perspective view of the entire machine. Fig. 2 is a vertical longitudinal section from the rear, taken through line $x$ $x$ of Fig. 3 and looking in the direction of the arrow. Fig. 3 is a vertical transverse section taken through line $y$ $y$ of Fig. 2 and looking in the direction of the arrow. Figs. 4, 5, and 6 are respectively edge, face, and top views of a modified form of platen and cutter. Fig. 7 shows an edge and face view of a stave cut by this form of platen; and Fig. 8 is a horizontal section showing the relation of the saw, platen-cutters, and feed-carriage.

A represents an upright rectangular main frame, having about the middle of the same, or half-way between top and bottom, a horizontal table-surface, A', and at the bottom an inclined metal-faced chute-board, A², upon which the sawed articles drop and are discharged at one side of the machine. At one end of the main frame and just above the table-surface is arranged a saw-mandrel, B, Fig. 2, having upon one side of the main frame a drive-pulley, B', Fig. 3, to which power is imparted from a belt from any suitable prime mover, and having upon the other end a large circular saw, B².

Figure 8:
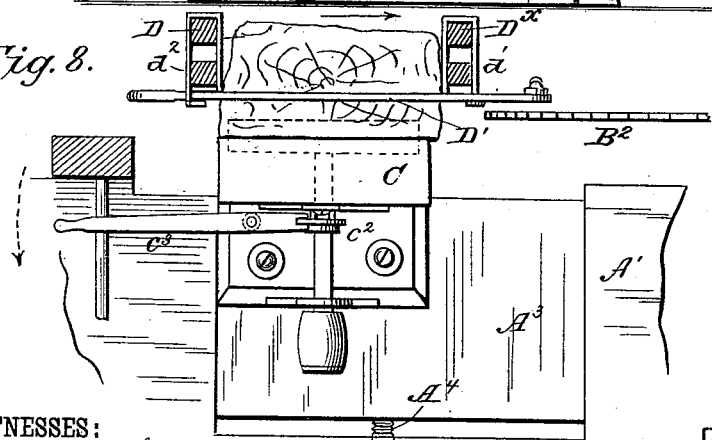

In the middle of the table A' is arranged an adjustable section, A³, whose ends are fitted to move in transverse guides in the table, and to which section an adjustment is given by a crank-screw, A⁴, Figs. 3 and 8, or other device. On the edge of this movable section next to the saw is mounted a vertical platen, C, which has an overlapping flange or ledge, C', which is detachably fastened by bolts or screws to the said movable section. In the face of this platen next to the saw is arranged a disk-shaped head, C², Figs. 1 and 3, with cutters $c$ near its outer periphery arranged to cut at right angles to the saw, and an auger-bit, $c'$, at the center. This head is rigidly attached to a short shaft, C³, which revolves freely in bearings in the platen and has also an endwise motion, so that the cutters $c$ and bit $c'$ may be projected beyond the face of the platen or be withdrawn so that the cutters are inside of or back of the face of the platen. The shaft C³, bearing these cutters, is revolved by a pulley, C⁴, which is connected by belt C⁵, Fig. 3, to a roller, C⁶, at the end of the frame, which roller is in turn connected to the saw-mandrel and derives its motion therefrom through a belt, C⁷. The cutter-head shaft C³ is provided with a rigid collar, $c²$, Fig. 8, which turns loosely in the notched or forked end of a hand-lever, $c³$, the deflection of which latter in horizontal direction is made to give the shaft C³ an endwise motion to protrude the cutters beyond the platen-face, while a spring, $c⁴$, fastened to the back of the platen, bears against the said collar and forces the cutter-head and shaft back again.

The platen C forms an abutment against which a block of wood is forced, which, after being scored with a circular groove by the cutter, is then fed up to the saw, as indicated by the arrow in Fig. 8, across the face of the platen to slice off the desired thickness. It will therefore be observed that the face of the platen is set a distance from the plane of the saw equal to the thickness of the slice to be cut, which may be varied by the adjustment of the table-section A³ and crank-screw A⁴.

For holding the block or bolt of wood while the cutter-head scores the circular groove, and also while the slice is being taken off by the saw, an upright or vertical carriage-frame, D, is provided, which slides on polished steel guide-rods D⁷ D⁷, the lower one of which is sustained in brackets, and the upper one of which is contained between the parallel bars A⁵ A⁵ of the frame-work. To reduce friction to a minimum, the upper part of frame D is sustained upon the upper guide-rod by means of anti-friction rollers d, Fig. 1, whereby the block-frame is made to respond sensitively either to the pressure of the hand of the workman or to the automatic feed mechanism hereinafter described.

To hold the block of wood (from which the articles are cut) in the frame D, a horizontal lever, D', is fulcrumed to a bracket, d', of the frame, and has its handle end playing in a slot in a bracket, d², and the end opposite the handle is connected by an adjustable connecting-rod, D², Figs. 2 and 3, with a second horizontal lever, D³, which plays in a bracket, d³, and is fulcrumed to the bottom of the frame D on the same side thereof as the handle of the lever above. The upper lever, D', is provided on the lower edge with a knife-edged blade, and when the handle of the upper lever is brought down its blade buries in the block of wood on top, while the blade below buries into the wood at the bottom of the block lengthwise the grain and securely holds the block in the frame D, as in Fig. 8, while it is being operated upon by the cutters and saw. To adjust the holding-levers to the vertical height of the block, the brackets carrying the levers are made vertically adjustable by slotting the side bars of the frame D and altering the position of the brackets thereon by means of set-screws, a corresponding adjustment of the connecting-rod D² being made, so as to lengthen or shorten the same in proportion to the increased or diminished distance between the two clamping-levers. A stop, D⁴, Fig. 1, with set-screw sliding in a slot in the bottom of frame D, is also made to fix the position of the block in the frame D in horizontal direction.

E, Fig. 1, is a latch-lever, which is fulcrumed to the carriage-frame D, and is adapted to engage a notch in an offsetting-bar, E', on the main frame to act as a stop and define exactly the position of the carriage-frame and block with relation to the center of the cutter in the platen C, whereby the workman may readily and without great effort or care always bring the center of the block to the center of the cutter, thus avoiding the cutting of imperfect disks and enabling him to get the largest possible disk out of the smallest block without wasting any material caused by allowing a margin for error.

The operation of the machine as so far described is as follows: The frame D being brought to a position central, or nearly so, to the cutter-head of the platen C, as in Fig. 8, it is there held by the engagement of the latch-lever E with the notched bar E', Fig. 1. The block or bolt is then inserted, with the grain running in a vertical plane, and is fixed in a position central to the cutter-head by adjusting the brackets of the clamping-levers and the stop D⁴ to the block. The knife-edged levers D' and D³ are then made to bite and hold the block in this position. The revolving cutter-head is then advanced from the platen by the deflection of lever c³, as indicated by dotted arrow, Fig. 8, and cutters score a circular groove and also a central hole in the block a depth equal to the thickness of the disk to be cut. The cutter-head is then allowed to retire, and the workman then raises latch E, and by hand forces the carriage-frame D up to and past the edge of the saw, as indicated by the full arrow, which slices off a layer or section of the block equal in thickness to the depth of the circular score, and the cut-off disk falls to the inclined chute-board below. It is not always necessary that the cutter head should have a central bit; but for all such uses as require the disk to be fitted over a former in making fruit-baskets or vegetable-barrels the central hole in the disk is desirable to receive the centering-pin on the former and hold the disk to its proper position while the body portion is being nailed on.

In some cases it may be desirable to feed the block-carriage to the saw automatically, and for this purpose the top bar D⁵, Fig. 1, of the carriage-frame is made longer than the frame D is wide, and it rises to a little higher level than the top bars, A⁵ A⁵, of main frame. A friction-roller, F, is made to bear upon the top of this bar D⁵, and this roller is fast on a shaft, F', which also carries a drive-pulley, F², connected by a belt, F³, to the saw-mandrel, whence it derives its motion. Near the friction-roller F the shaft F' is carried in a vertically-adjustable bearing, F⁴, mounted upon the end of a lever, F⁵, Fig. 2, which at its opposite end connects with a slide-bar, F⁶, Fig. 1, operated by a lever-handle, F⁷, at its lower end. By moving this lever-handle up or down it will be seen that the friction-roller above the frame D may be brought into contact with its top bar to feed said frame or be lifted to a position where it has no effect thereon.

In making use of the platen C with the revolving cutter-head, I do not confine myself to a single cutter-head, but may use two or more, so as to cut several disks at the same time. I may also modify the construction of the revolving cutter in said platen, so as to adapt the machine to cut keg or barrel staves, and in the same operation form the croze or groove in each end, and by a still further modification the same machine may be used to saw shingles and cut off the butts. This modified construction of platen and cutter is shown in Figs. 4, 5, 6. The platen C is in such case provided with a frame, G G G' G², formed of the horizontal levers G G at top and bottom of the platen, the vertical bar G' at one side connecting the two ends of horizontal levers, and the vertical shaft G² at the other side bearing a cutter-wheel, g, at the top and another, g, at the bottom, arranged to revolve in horizontal planes. This frame G G G' G² is fulcrumed upon a middle vertical shaft, G³, in the platen, and the vertical bar G' of said frame is connected with the horizontal hand-lever c³, by moving which the frame is oscillated about its vertical pivot-rod $G^3$, and the cutter-wheels projected beyond the face of the platen or drawn back of the same. The cutter-wheel shaft $G^2$ is provided at its upper end with a band-pulley, $G^4$, which by a belt connects with and derives motion from the roller $C^6$. To use this form of platen the platen C of Figs. 1, 2, 3 is removed by unbolting its ledge $C'$ from table $A^3$, and the platen in Figs. 5 and 6 is put in its place. It will now be perceived that when the block of wood is fixed in frame D and the cutters of the platen are forced outward by the hand-lever $c^3$ a horizontal groove is cut in the top and bottom of the block just deep enough to form the croze in the ends of the stave, and then when the block is fed up to the saw the latter slices off a stave with the croze-grooves formed in them, as in Fig. 7. It is desirable to have these croze-grooves in each stave deepest in the middle, or of curved form at the bottom of the groove to fit the round contour of the disk forming the bottom or head. This is permitted by my construction by simply giving the greatest throw to the hand-lever $c^3$ at the time that the stave-blank is in a middle position with respect to the cutters. A very slight addition to this platen makes a good shingle-machine for sawing tapering shingles, and at the same time cutting off the butts. For this purpose an oscillating plate, P, Fig. 4, is fulcrumed on a middle horizontal line to the platen. When the upper end of this plate is forced against the platen and the block adjusted thereto, a taper shingle is cut by the saw with the butt end at the top, which butt is first sawed off at the top by the upper cutter-wheel, and is then sliced off by the saw. When the plate has its lower end forced into the platen, a shingle with a butt at the bottom is cut, the butt being first sawed off square by the lower cutter, and the shingle then sliced off from the block.

It will thus be seen that my machine is in the nature of a combined shaping and sawing machine in which cutters act first upon a block at right angles to the plane of the slicing-saw to give shape to the article before being sliced, while the slicing-saw acts afterward to sever the completed article from the block, which gives it a wide range of use and makes it a very rapid, efficient, and economical machine for a large class of work—such as the manufacture of pails, tubs, barrels, kegs, measures, fruit-baskets, and other articles requiring circular heads or bottoms, (with either plain or beveled edges,) staves, shingles, &c.

To protect the workman from accidental contact with the outer edge of the saw, an overlapping metal guard-strip, S, is placed around the exposed part of its periphery.

In using the cutter-head $C^2$ in the platen, it may have in the place of the cutter $c\,c$, or in connection with the same, planing-knives, which serve to plane the face of block before the section is sliced off by the saw. The guide-rods $D^7$, I also mount in slots in their supporting-brackets, so as to alter the plane of the carriage D from the vertical to a slight inclination to either side of the vertical for sawing tapered slices or sections larger at one end than the other.

In making use of the machine herein described, its position may be so changed as to permit the block-carriage to work vertically instead of horizontally, as shown, without departing from my invention, the general construction and arrangement of parts remaining substantially the same.

In defining my invention with greater clearness, I would state that I am aware that a machine for making buttons and checkers has been constructed in which a circular cutter is made to advance against a block in the block-carriage, and the block-carriage then made to advance to a circular saw to slice off the checkers or buttons, but without a platen which encompasses said rotary cutter. My invention is therefore distinct in the new combination of parts which the platen affords, and its value and function are important in that it not only houses and protects the rotary cutters when they are retracted, but it also acts as a steadying brace or guide for the block as it is advanced to the saw, and by the extended face of said platen the range of use of the machine is very greatly widened, so as to make an efficient shingle and stave machine.

Having thus described my invention, what I claim as new is—

1. A combined shaping and sawing machine consisting of a saw, a carriage or frame with means for clamping the block arranged on guides to slide in a plane parallel with the saw, a stationary platen arranged in front of the saw but upon the opposite side of the same from the block-carriage, and a revolving cutter or cutters arranged in said platen to cut in a plane at right angles to the saw and preliminarily cut the block to shape before slicing off the article, all combined substantially as shown and described.

2. A combined shaping and sawing machine consisting of a saw, a carriage or frame with means for clamping the block arranged on guides to slide in a plane parallel with the saw, a stationary platen arranged in front of the saw but upon the opposite side of the same from the block-carriage, a revolving cutter or cutters arranged in said platen to cut in a plane at right angles to the saw, and adjusting means, substantially as described, for projecting said cutter a greater or less depth into the block, all combined as shown and described.

3. A combined shaping and sawing machine consisting of a saw, a carriage or frame with means for clamping the block arranged on guides to slide in a plane parallel with the saw, a platen arranged in front of the saw but upon the opposite side of the saw from the block-carriage, an adjustable support for the platen for varying its distance from the line of saw-cut, a revolving cutter or cutters arranged in said platen to cut in a plane at right angles to the saw, and means, substantially as described, for projecting this cutter a greater or less depth into the block, all combined substantially as and for the purpose described.

4. A combined shaping and sawing machine consisting of a saw, a carriage or frame with means for clamping the block arranged in guides to slide in a plane parallel with the saw, a stationary platen arranged in front of the saw but upon the opposite side of the same from the block carriage, a revolving cutter or cutters arranged in said platen to cut in a plane at right angles to the saw, and a latch or stop device for defining the position of the block-carriage with respect to the revolving cutters of the platen, all combined substantially as shown and described.

5. The block-frame D, provided with adjustable brackets carrying clamping levers arranged upon opposite sides of the frame, and an adjustable connecting-rod connecting said levers, substantially as and for the purpose described.

6. The combination of the saw and the main frame having guides, the block-carriage D, moving upon said guides, the shaft $F'$, with friction-roller F and drive-pulley $F^2$, the said roller being arranged to bear on the top of the block-frame, the adjustable bearing $F^4$, carrying shaft F, horizontal lever $F^5$, connected to said bearing, vertical slide-bar $F^6$, connected to lever $F^5$, and horizontal hand-lever $F^7$, connecting with the lower end of said slide-bar for the operation of the carriage, substantially as shown and described.

WILLIAM HUEY.

Witnesses:
N. T. FITCH,
HENRY J. CRIPPEN.